United States Patent [19]

Schafferus et al.

[11] Patent Number: 5,094,894
[45] Date of Patent: Mar. 10, 1992

[54] CONVOLUTED BOOT

[75] Inventors: Thomas Schafferus, Rheinberg; Karl-Heinz Müller, Wissen, both of Fed. Rep. of Germany

[73] Assignee: GKN Automotive AG, Siegburg, Fed. Rep. of Germany

[21] Appl. No.: 604,752

[22] Filed: Oct. 26, 1990

[30] Foreign Application Priority Data

Oct. 31, 1989 [DE] Fed. Rep. of Germany ....... 3936276

[51] Int. Cl.$^5$ .......................... F16D 3/84; F16J 3/04
[52] U.S. Cl. .......................... 428/36.9; 277/212 FB; 464/175
[58] Field of Search ............... 428/36.9; 464/175; 277/212 FB

[56] References Cited

U.S. PATENT DOCUMENTS

| | | | |
|---|---|---|---|
| 4,360,209 | 11/1982 | Ukai et al. | 464/175 |
| 4,559,025 | 12/1985 | Dore | 464/175 |
| 4,673,188 | 6/1987 | Matsuno et al. | 464/175 |
| 4,878,389 | 11/1989 | Boge | 464/175 |

Primary Examiner—James J. Seidleck
Attorney, Agent, or Firm—Toren, McGeady & Associates

[57] ABSTRACT

A convoluted boot made of a thin-walled thermoplastic elastomer with at least one collar region which, on its inside, has an internal annular bead engaging a flat annular groove of a universal joint with a rectangular or trapezoidal cross-section, where at least the one collar region, on its outside, has an annular groove with a rectangular or trapezoidal cross-section for tensioning element, which annular groove is provided with a substantially flat bottom part resting against the tensioning element and is wider than the internal annular bead, and the collar region, within the flat annular groove in the region of the internal annular bead, has at least one recess-like annular gap with a rectangular or trapezoidal cross-section whose cross-sectional depth is greater than its width.

5 Claims, 1 Drawing Sheet

CONVOLUTED BOOT

BACKGROUND OF THE INVENTION

The invention relates to a convoluted boot made of a thin-walled thermoplastic elastomer with at least one collar region which, on its inside, comprises an internal annular bead engaging a flat annular groove of a universal joint with a rectangular or trapezoidal cross-section.

Such convoluted boots made of a material such as Hytrel ( ® Dupont) or Santoprene ( ® Monsanto) have a considerably higher modulus of elasticity than previously used rubber-elastic materials, which means that holding the collar regions on the respective universal joint components or the like constitutes a problem. The tensioning elements used have to meet more stringent requirements because higher pretensioning forces have to be applied.

To reduce the necessary forces it is proposed in JP 62-16541 Y 2, for example, to provide the outer groove with a projecting central web so that deformation by the tensioning element remains limited to this central web, the disadvantage of this design being that the material of the radially loaded web may flow into the large-volume annular spaces underneath the tensioning element, thereby loosening the connection.

SUMMARY OF THE INVENTION

It is an object of the present invention to design a convoluted boot in the region of its collar in such a way that it is possible to use conventional tensioning elements, i.e., tensioning strips of standard strength while at the same time ensuring a firm fit of the collar region. The boot is to be produced by blow molding.

In accordance with the invention, the objective is achieved in that at least the one collar region, on its outside, comprises an annular groove with a rectangular or trapezoidal cross-section for a tensioning element, which annular groove is provided with a substantially flat bottom part resting against the tensioning element and is wider than the internal annular. The collar region, within the flat annular groove in the region of the internal annular bead, comprises at least one recess-like annular gap with a rectangular or trapezoidal cross-section whose cross-sectional depth is greater than its width.

Such a boot ensures a secure form-fitting engagement between the internal bead and the respective annular groove, which engagement, because of the large area of contact between the tensioning strip and the outer groove, cannot be released. The internal bead is preferably slightly wider than the corresponding groove in the joint component or the like so that full sealing is ensured, especially in the flank regions.

As there are no large-volume spaces underneath the tensioning strip, the internal bead cannot be lifted out of the annular groove.

Because of the recess-like annular gap in the externally positioned annular groove, it is possible to produce the boot by the blow molding method which uses hose material of a uniform wall thickness. Without the deep annular gaps proposed by the invention, which result in material displacement during the blowing process, the internal annular bead could only be produced while simultaneously creating large-volume hollow spaces underneath the tensioning strip on the outside, which would again cause the disadvantages as described above.

In a preferred embodiment, the ratio of depth to width of the recess-like annular gap amounts to approximately 3, with the depth of the annular gap approximately corresponding to the thickness of the collar region in the annular groove adjoining the internal annular bead and amounting to between 1.2 and 2 mm in order to achieve satisfactory strength conditions. Preferably, two such annular gaps are provided and it is possible to arrange them asymmetrically relative to the external annular groove.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
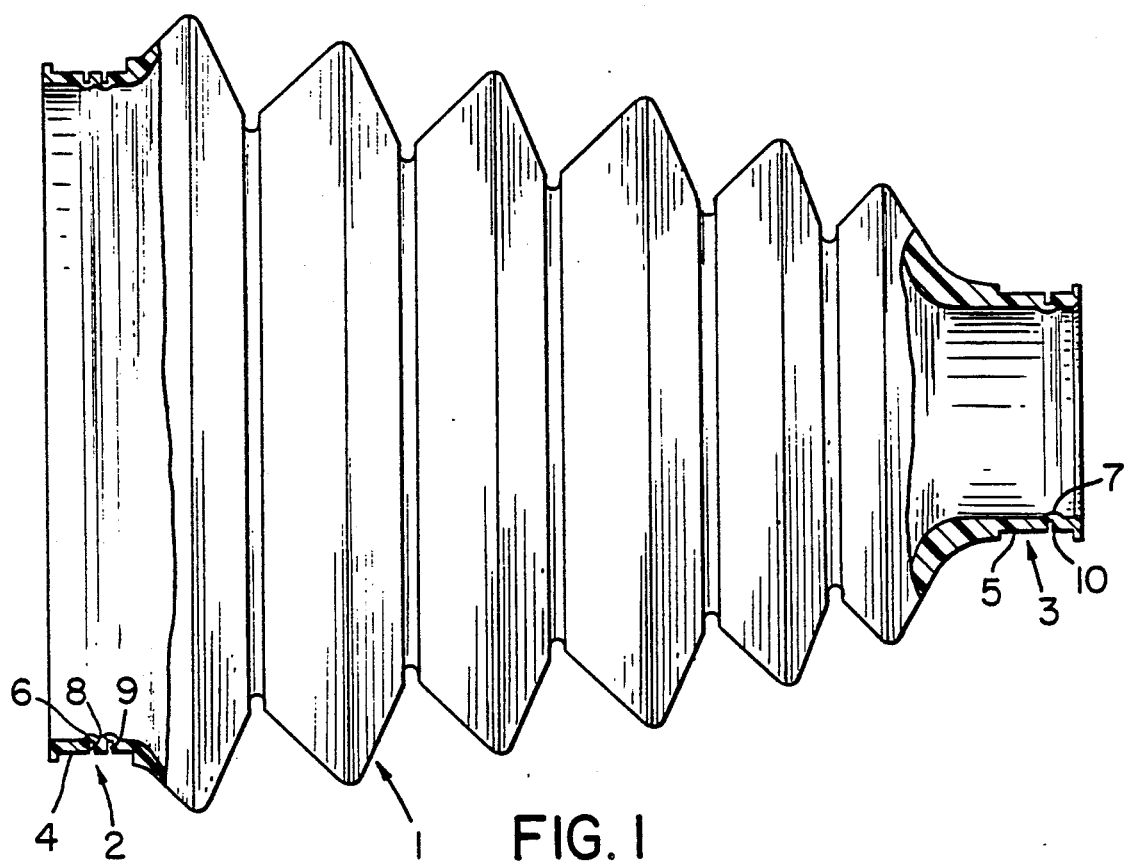
FIG. 1 shows a complete view, partially in section, of a convoluted boot provided with the collar region as proposed by the invention.

FIG. 1 shows a boot 1 with a first collar region 2 and a second collar region 3, partially in section, and it can be seen that the collar regions 2, 3 each comprise a flat circumferential groove 4, 5, the groove 4 having internal annular gaps 8, 9, whereas the annular groove 5 is provided with a single deep annular gap 10 in the region of the internal annular bead 7.

Figure 2:
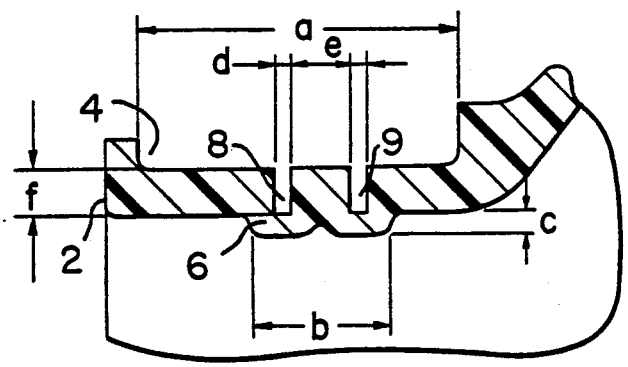
FIG. 2 shows a collar region in accordance with the invention in the form of a detail.

FIG. 2 shows a collar region 2 in the form of a detail showing the annular groove 4 having a width a within which there is positioned an internal bead 6 having a considerably smaller width b and a radial depth c. In the region of the annular bead 6 there are provided the two annular gaps 8, 9 for forming the internal annular bead 6, which annular gaps, as compared to the width a of the annular groove 4, have a very small width d, e and great depth f which corresponds to the thickness of the collar region 2 laterally adjoining the internal annular bead 6.

While the invention has been illustrated and described as embodied in a convoluted boot, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A Convoluted boot made of a thin-walled thermoplastic elastomer with at least one collar region (2, 3) which, on its inside, comprises an internal annular bead (6, 7) engageble with a flat annular groove of a universal joint with a rectangular or trapezoidal cross-section, at least one collar region (2, 3), on its outside, having an annular groove (4, 5) with a rectangular or trapezoidal cross-section for a tensioning element, which annular groove (4, 5) is provided with a substantially flat bottom part restable against the tensioning element and is wider than the internal annular bead (6, 7), and the collar region (2, 3), within the flat annular groove (4, 5) in a region of the internal annular bead (6, 7) having at least one recess-like annular gap (8, 9, 10) with a rectangular or trapezoidal cross-section whose cross-sectional depth is greater than its width.

2. A convoluted boot according to claim 1, wherein the recess-like annular gap (8, 9, 10) has a depth to width ratio of approximately 3.

3. A convoluted boot according to claim 1, wherein the depth of the recess-like annular gap (8, 9, 10) approximately corresponds to a thickness of the collar region in the flat annular groove (4, 5) adjoining the internal annular bead (6, 7).

4. A convoluted boot according to claim 1, wherein the collar region in the flat annular groove (4, 5) adjoining the internal annular bead (6, 7) has a thickness of 1.2-2 mm.

5. A convoluted boot according to claim 1, wherein at least two recess-like annular gaps (8, 9) are provided in the region of the internal annular bead (6).

* * * * *